United States Patent
Hui et al.

(10) Patent No.: US 8,064,433 B2
(45) Date of Patent: Nov. 22, 2011

(54) CONTROL ARCHITECTURE AND IMPLEMENTATION FOR SWITCHES WITH CARRIER SENSING

(75) Inventors: Joseph Y. Hui, Fountain Hills, AZ (US); David A. Daniel, Scottsdale, AZ (US)

(73) Assignees: Nuon, Inc., Scottsdale, AZ (US); Arizona Board of Regents for and on behalf of Arizona State University, Phoenix, AZ (US)

( * ) Notice: Subject to any disclaimer, the term of this patent is extended or adjusted under 35 U.S.C. 154(b) by 9 days.

(21) Appl. No.: 12/655,096

(22) Filed: Dec. 23, 2009

(65) Prior Publication Data
US 2010/0103945 A1 Apr. 29, 2010

Related U.S. Application Data

(63) Continuation-in-part of application No. 12/148,708, filed on Apr. 21, 2008.

(60) Provisional application No. 61/203,602, filed on Dec. 24, 2008.

(51) Int. Cl.
*H04L 12/28* (2006.01)
*H04L 12/50* (2006.01)
*H04L 12/56* (2006.01)
*H04L 12/413* (2006.01)
*H04Q 11/00* (2006.01)
*H04J 14/02* (2006.01)

(52) U.S. Cl. ........ 370/351; 370/369; 370/388; 370/400; 370/445; 398/79

(58) Field of Classification Search .......... 370/351–356, 370/369, 370, 372, 375, 388, 400, 445
See application file for complete search history.

(56) References Cited

U.S. PATENT DOCUMENTS

| | | | | |
|---|---|---|---|---|
| 4,191,941 | A | * | 3/1980 | Springer et al. ............... 340/2.2 |
| 5,276,425 | A | * | 1/1994 | Swanson et al. ............. 340/2.22 |
| 5,396,491 | A | * | 3/1995 | Newman ....................... 370/355 |
| 5,600,466 | A | * | 2/1997 | Tsushima et al. ............... 398/79 |
| 6,256,312 | B1 | * | 7/2001 | Joh ............................... 370/401 |
| 6,907,041 | B1 | * | 6/2005 | Turner et al. .................. 370/412 |
| 6,947,439 | B2 | * | 9/2005 | Vasquez et al. ............... 370/427 |
| 7,394,806 | B2 | * | 7/2008 | Beshai et al. ................. 370/380 |
| 2002/0044560 | A1 | * | 4/2002 | Dally et al. .................... 370/401 |
| 2003/0103500 | A1 | * | 6/2003 | Menon et al. ................. 370/389 |

OTHER PUBLICATIONS

Chong, Fred et al "Fault Tolerance and Performance of Multipath Multistage Interconnection Networks" Advanced Research in VLSI and Parallel Systems 1992. MIT press, Mar. 1992.*

* cited by examiner

*Primary Examiner* — Xavier Szewai Wong
(74) *Attorney, Agent, or Firm* — Robert C. Klinger (57) ABSTRACT

A scalable switch, a system of switches and methods, configured to sense a carrier at the output of the respective switch. The invention intelligently, and dynamically, controls the connection of a respective switch input to a respective switch output as a function of a carrier being present, or absent, at a selected output. Alternatively, a control plane is adopted to make request to send and acknowledge clearance to send. These control methods operate on a step-by-step manner allowing fast and parallel connectivity to be established to connect a variety of interfaces, including Ethernet, PCI, SCSI, and FibreChannels. The present invention reduces switch cost, energy cost, and switch volume, while allowing scalability of connection requirements, reduction of delay, and promotion of green IT.

16 Claims, 13 Drawing Sheets

CONTROL ARCHITECTURE AND IMPLEMENTATION FOR SWITCHES WITH CARRIER SENSING

CLAIM OF PRIORITY

This application is a continuation-in-part of U.S. patent application Ser. No. 12/148,708 filed Apr. 21, 2008 entitled Space-Time Carrier Sense Multiple Access, and also claims priority of U.S. Provisional Patent Application Ser. No. 61/203,602 entitled "CONTROL ARCHITECTURE AND IMPLEMENTATION FOR CARRIER SENSED INTEGRATED SWITCHES" filed Dec. 24, 2008, the teachings of which are incorporated herein by reference.

FIELD OF THE INVENTION

The present invention relates to a switching control for Ethernet networks for single or multistage interconnection networks.

BACKGROUND OF THE INVENTION

Ethernet switching is provided to interconnect multiple Ethernets for the exchange of Ethernet data frames. Most Ethernet switches require data buffering and Ethernet signal regeneration at the switch which incur the problems of substantial signal processing, power consumption, and transmission delay. In copending U.S. patent application Ser. No. 12/148,708, the teachings which are incorporated by reference, we extended the carrier sensing multiple accessing of Ethernet to route through a Multi-stage Interconnection Network (MIN). The invention described in Ser. No. 12/148,708 relieves these problems by allowing Ethernet signals to pass through a multistage interconnection network with fast control and minimum processing and delay, thereby producing a switch that consumes substantially less power. At each stage of the network, carrier sensing is performed in the transmission path. Carrier sensing is performed step-by-step and in-band until an end-to-end transmission path is found.

The present invention described herein provides a new out-of-band control method for an Ethernet switch that solves the same problems.

In conventional Carrier Sense Multiple Access with Collision Detection (CSMA/CD), a communication node first senses if a carrier is present in the transmission medium. If the medium is sensed busy, then the attempt to transmit is delayed. If the medium is sensed idle, then the transmission proceeds immediately. However, it is possible that two nodes sensing an idle medium may transmit simultaneously, resulting in a transmission collision. With Collision Detection (CD) by each transmitting node, transmission is aborted and a random time delay is introduced for each node to attempt transmission again via the CSMA/CD protocol.

An alternative Carrier Sense Multiple Access with Collision Avoidance (CSMA/CA) employs a handshake procedure instead. The transmitting node issues a Request-to-Send (RTS) signal and must receive back a Clear-to-Send (CTS) signal from the intended receiving node before beginning a transmission. The handshake serves as a notification to all other nodes to refrain from transmitting, thus avoiding collisions. This extension to the CSMA protocol is primarily intended for use with wireless transmission media where CSMA/CD would not work because it is not possible for a node to listen and detect a collision while transmitting.

Both CSMA/CD and CSMA/CA utilize timing (temporal switching) of the transmission to avoid collision. A third technique that utilizes spatial switching to avoid collision in disclosed in U.S. patent application Ser. No. 12/148,708 which extended the CSMA/CD protocol to sense presence or absence of a carrier at random times in a single medium. Through Carrier Sense Multiple Access in Time-Space (CSMA/TS), carrier sensing is performed step-by-step for multiple links in a path and is possible over alternative paths. Hence, carrier sensing is performed not only in time, but also in the space of multiple links and multiple paths.

Carrier sensing for data rate beyond Gigabit per second (Gb/s) speed is difficult technically, and hence is not practiced for 10 GB/s Ethernet. The difficulty comes from two reasons: first, at high data rate, propagation delay relative to packet transmission time becomes significant and second, carrier sensing of a transmission medium may disturb signal fidelity. The present invention employs CSMA/TS using a unique and innovative out-of-band control network for media access and routing. Instead of carrier sensing and collision detection/avoidance, the invention advantageously takes the approach of sending explicit RTS and CTS messages through an out-of-band multi-stage network.

Route control of Multi-stage Interconnection Networks (MIN) is difficult to perform in parallel and fast. Switches built using MN are typically controlled by centralized Stored Program Control (SPC). Route establishment is often performed sequentially and therefore does not scale well with increasing traffic and switch size.

One aspect of the invention, instead of using SPC for routing, employs a separate control plane with parallelism. The invention discloses new and parallel routing and contention resolution mechanisms for an aggregate switch throughput in tens of Terabits per second on a frame by frame basis.

Having a separate control plane also facilitates more connectivity functions which we include in this patent application. The disclosed switch can control connectivity flexibly. Connectivity can be made frame by frame, or semi-permanently such as in establishing Virtual Local Area Network (VLAN). The disclosed switch can provide connectivity not only for Ethernets but also for other interfaces including Small Computer Standard Interface (SCSI) and Peripheral Computer Interface (PCI or serialized PCI called PCI Express). This architecture is hereafter referred to as Carrier Sensed Integrated Switching (CSIS).

SUMMARY OF THE INVENTION

The invention solves the problem of severe speed, capacity, power and processing requirements of high speed Ethernet switching. The result is a high capacity switch for connection interfaces such as Ethernet, SCSI, and PCI, achieved at low cost while reducing heat production, volume requirement, and latency incurred.

Electrical Ethernet signals are transmitted "as is" through a Multi-stage Interconnection Network (MIN) called the Physical Plane. Without regeneration and buffering of Ethernet signal and data, much of the processing and delay is removed. This requires a shift of accessing, routing and other functions to the Ethernet interface, which employs carrier sensing in both space and time to route data through the Physical Plane. The Ethernet interface translates the destination Ethernet address into a routing address. The routing address is sent prior to sending Ethernet data.

At the Ethernet switch, this route information, together with other control signals for a Request-to-Send (RTS) signal, are diverted to a Control Plane that performs three functions. First, route information is decoded through an address de-multiplexer. Second, contention for a destination Ethernet is resolved through a contention resolution multiplexer. Third, the Ethernet with a successful RTS is acknowledged with a Clear-to-Send (CTS) signal, while the Control Plane completes the connection of the two Ethernets in the Physical Plane. After CTS signal is received, the Ethernet interface begins transmitting Ethernet data frames.

To build a larger switch than that of a single Switch Plane (SP), we provide a two-stage SS switching network and a three-stage SSS switching network. The step-by-step and out-of-band control architecture is extended for the MIN. Alternative paths could be used by the Control Plane to improve throughput of the switch network.

The interconnection and control architecture is applicable to switching data transported by other physical media other than Ethernet, such as for the Internet, Virtual LAN, SCSI, and PCI. This is possible because the Physical Plane is data format agnostic as it transmits signals as is. Control mechanisms are also described that enable the invention to switch these other transmission protocols.

DETAILED DESCRIPTION OF THE PRESENT INVENTION

The Components of the Switching System

Figure 1:
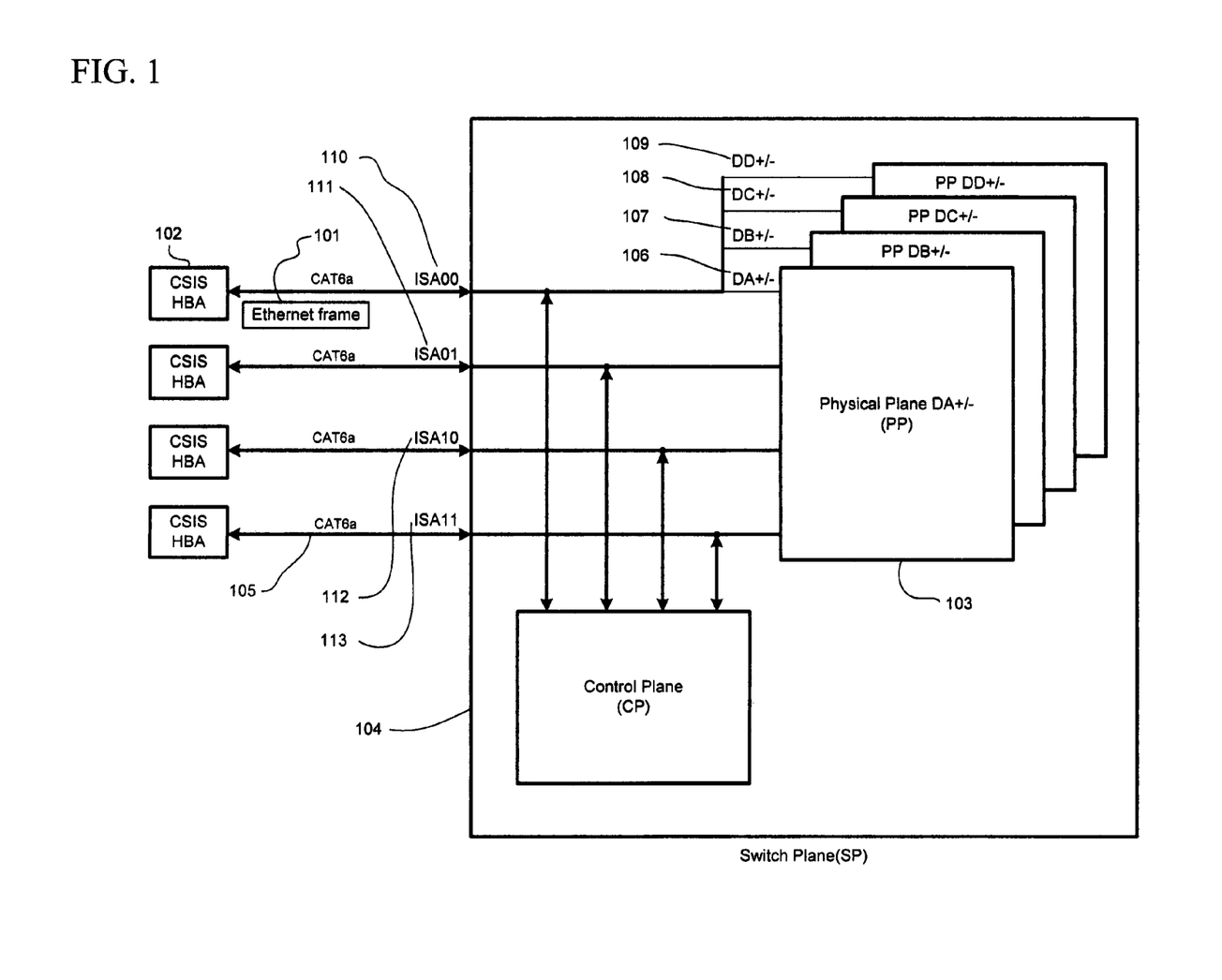
FIG. 1 is a block diagram showing an architecture of a carrier sensing switching system.

Referring to FIG. 1, Ethernet signals [101] are transported from an Ethernet interface [102] as is through a Physical Plane (PP) [103], which is a single or multi-stage network of Switch Planes (SP) [104], without data buffering and signal regeneration. The signal is amplified if needed.

The CSIS Host Bus Adapter (HBA) [102] that generates the Ethernet signal is connected to the switch via connectors such as but not limited to Category 6a (CAT6a) cables. Each CAT6a [105] cable has 4 pairs of wires for which each pair carries differentially coded modulation symbols. As an illustration in FIG. 1, the 4 pairs carrying differentially encoded signals designated as DA+/− [106], DB+/− [107], DC+/− [108], and DD+/− [109] are switched through 4 separate Physical Planes (PP). For simplicity of illustration, we show a PP that connects 4 CSIS HBAs. The PP in practice can be of size 32×32 or larger, interconnecting 32 or more HBAs. The HBAs are numbered sequentially in binary representation, i.e. the inputs are numbered in FIG. 1 as ISA00, ISA01, ISA10, and ISA11, respectively [110], [111], [112], [113]. This numbering is referred to as an Input Segment Address (ISA).

Network Interfaces Architecture

Figure 2:
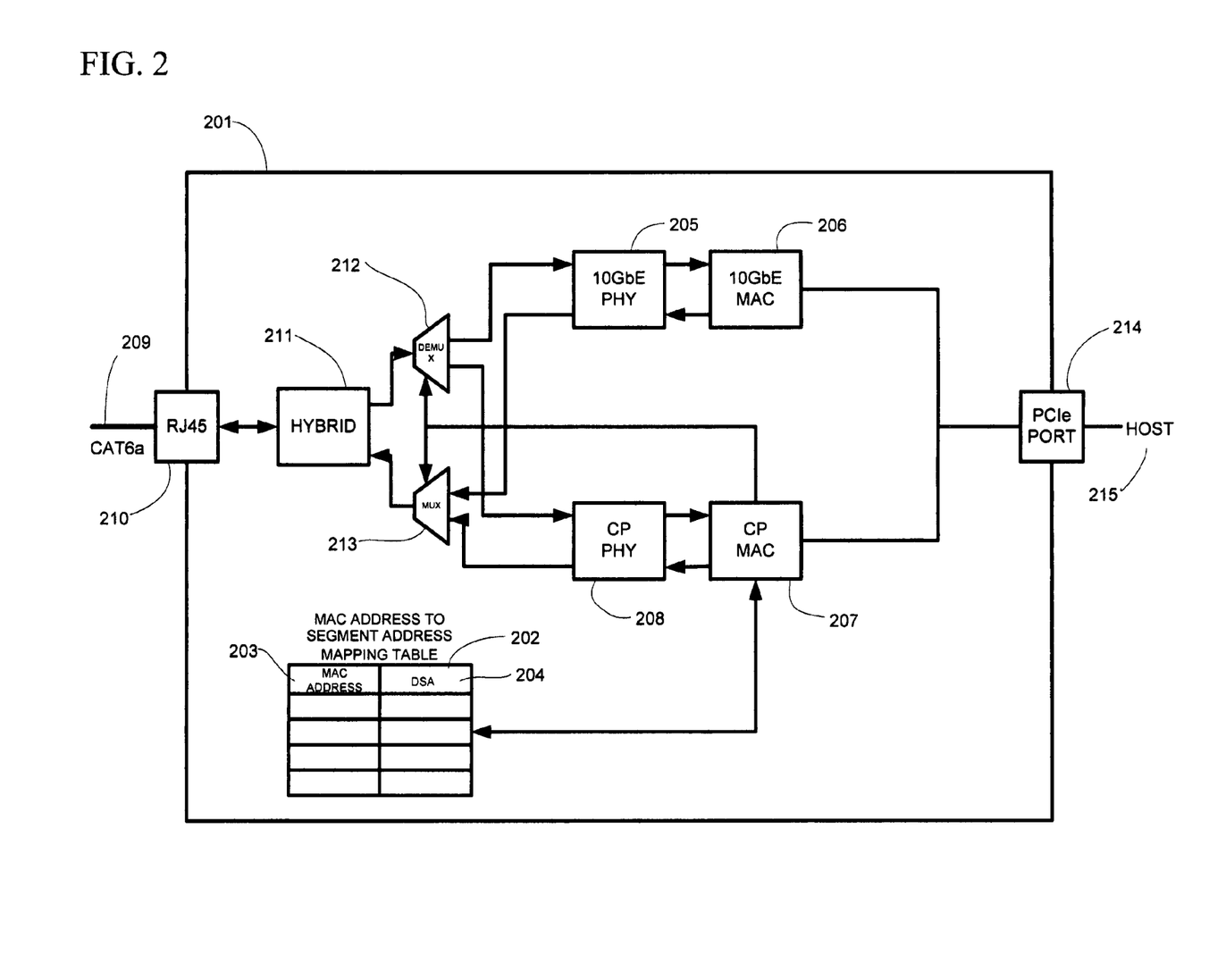
FIG. 2 is a functional block diagram showing the Carrier Sensed Integrated Switching Host Bus Adapter.

Referring to FIG. 1, The HBA [201] or an Ethernet interface close to the switch provides routing and carrier sensing information for switch control. A cache table [202] provides the translation of frequently used Ethernet addresses into the Destination Segment Address (DSA) [204], which represents the physical location of the destination Ethernet segment to be connected to. The HBA also sends other information such as Request To Send (RTS) to the switch, receives other information such as Clear To Send (CTS) from the switch, as well as perform other network management functions, such as address resolution. An example function is address resolution such as finding the DSA of the destination Ethernet if that translation is not found in the cache table. Another example function is the handshake involved when an HBA or Ethernet interface is initially connected to a switch, exchanging information such as Ethernet addresses of the HBA and segment address on which the HBA is established.

An Ethernet interface takes data input from the host [215] through the PCI Express (PCIe) port [214]. The data is then media access controlled (10 GbE MAC [206]) before being transmitted by the physical layer (10 GbE PHY [205]) through a connector such as an RJ45 [210]. From the connector the signal is transmitted on Ethernet transmission medium such as a CAT6a cable [209].

For full duplex Ethernet transmission, the Ethernet interface receives from the same Ethernet cable [209] and then physically and MAC processed [205], [206] before sending the processed data to the host [215] through the PCIe port [214]. A hybrid circuit [211] allows the mixing of signals on the same transmission line albeit in opposite direction.

We use the same PCIe port [214] and CAT6a [209] to transmit and receive carrier sensing control messages similar in manner for Ethernet frames. The control messages are processed by the Control Plane MAC [207] and the CP PHY [208]. To allow sharing of the transmission media, a DEMUX [212] and MUX [213] are used.

Control Signal Architecture

Figure 3:
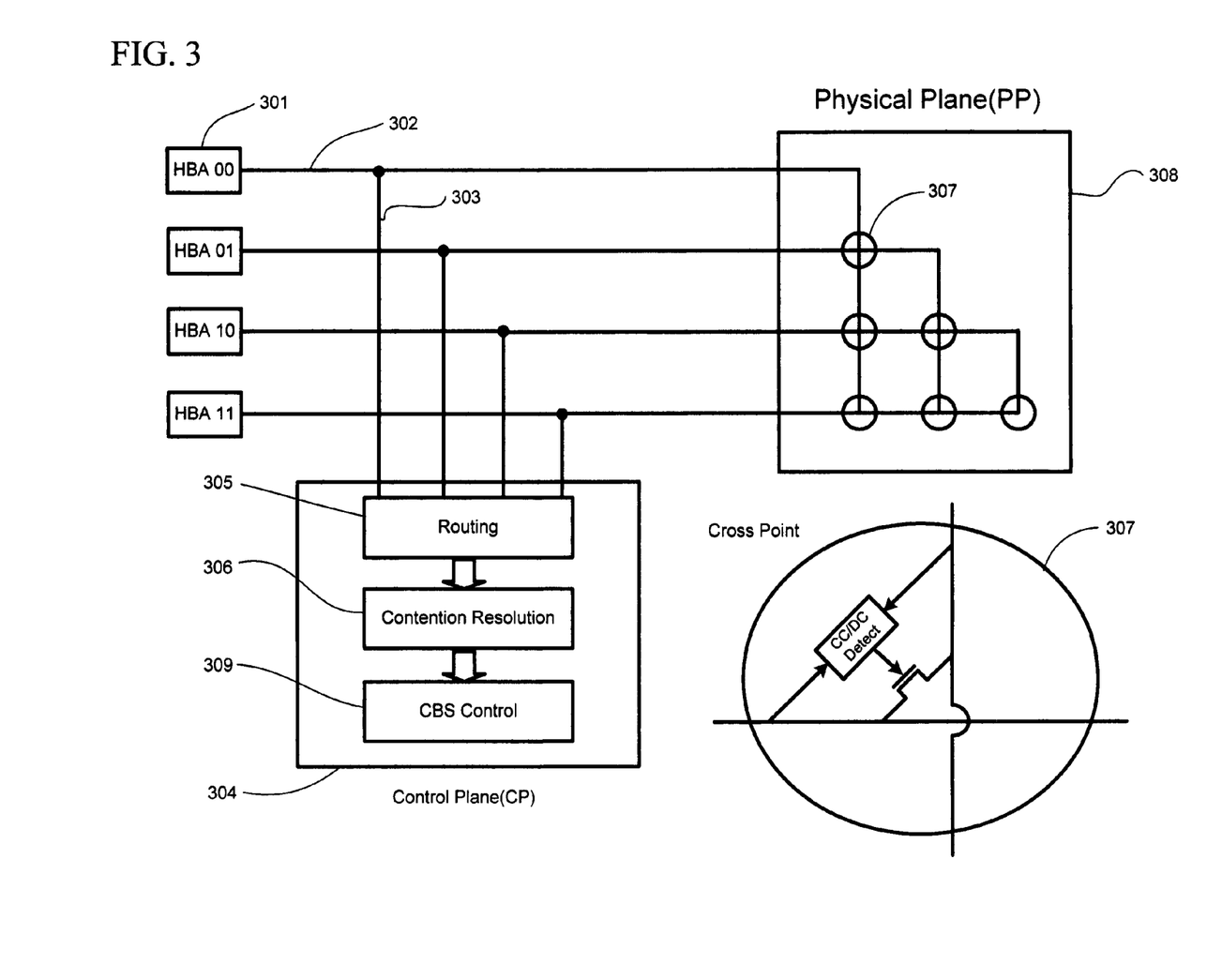
FIG. 3 is a block diagram showing signals in Physical Plane and Control Plane.

Referring to FIG. 3, to reduce processing and buffering of data, the PP [308] carries signals from the CSIS HBA [301] with little or no signal regeneration and buffering, thereby minimizing energy consumption and delay incurred. Roughly speaking, the PP [308] carries the signals as if they are analog signals. This reduces significantly the amount of digital processing of the Ethernet signals by the switch. The invention employs complex and effective signal processing of Ethernet interfaces to handle not only transmission impairments but also switching impairments. The signal transport can be half duplex or full duplex.

The Ethernet interface at the HBA [301] generates control data transported through the same transmission line [302] to the switch prior to transmitting Ethernet data frames. At the switch, control data is routed [303] in a separate Control Plane (CP) [304] for each SP for the three purposes of routing [305], output contention resolution [306], as well as control [309] of the cross point [307] of the Cross Bar Switch (CBS) [308] in the Physical Plane for data transport.

Figure 4:
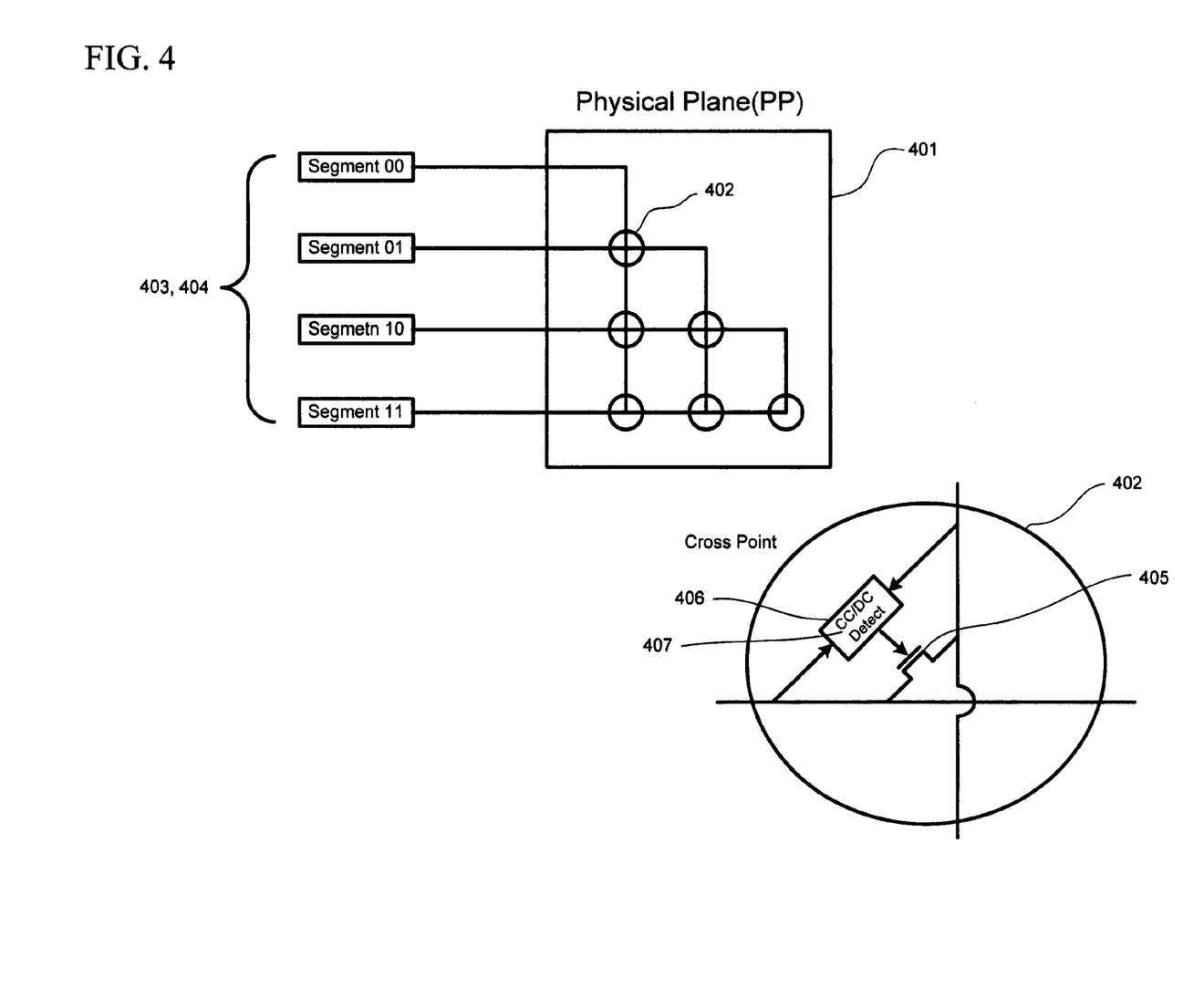
FIG. 4 is a block diagram showing a Cross Bar Switch.

Referring to FIG. 4, the construction of a Cross Bar Switch (CBS) may be seen. A cross point [402] allows full duplex signals to be transmitted across 2 segments [403], [404]. A cross point is closed when a transmission gate [405] is in a conductive state, otherwise in a non-conductive state a cross point is open. Simple control circuits [406] for detecting connect and disconnect commands (CC/DC) [407] determine if the cross points should be open or closed.

Figure 5:
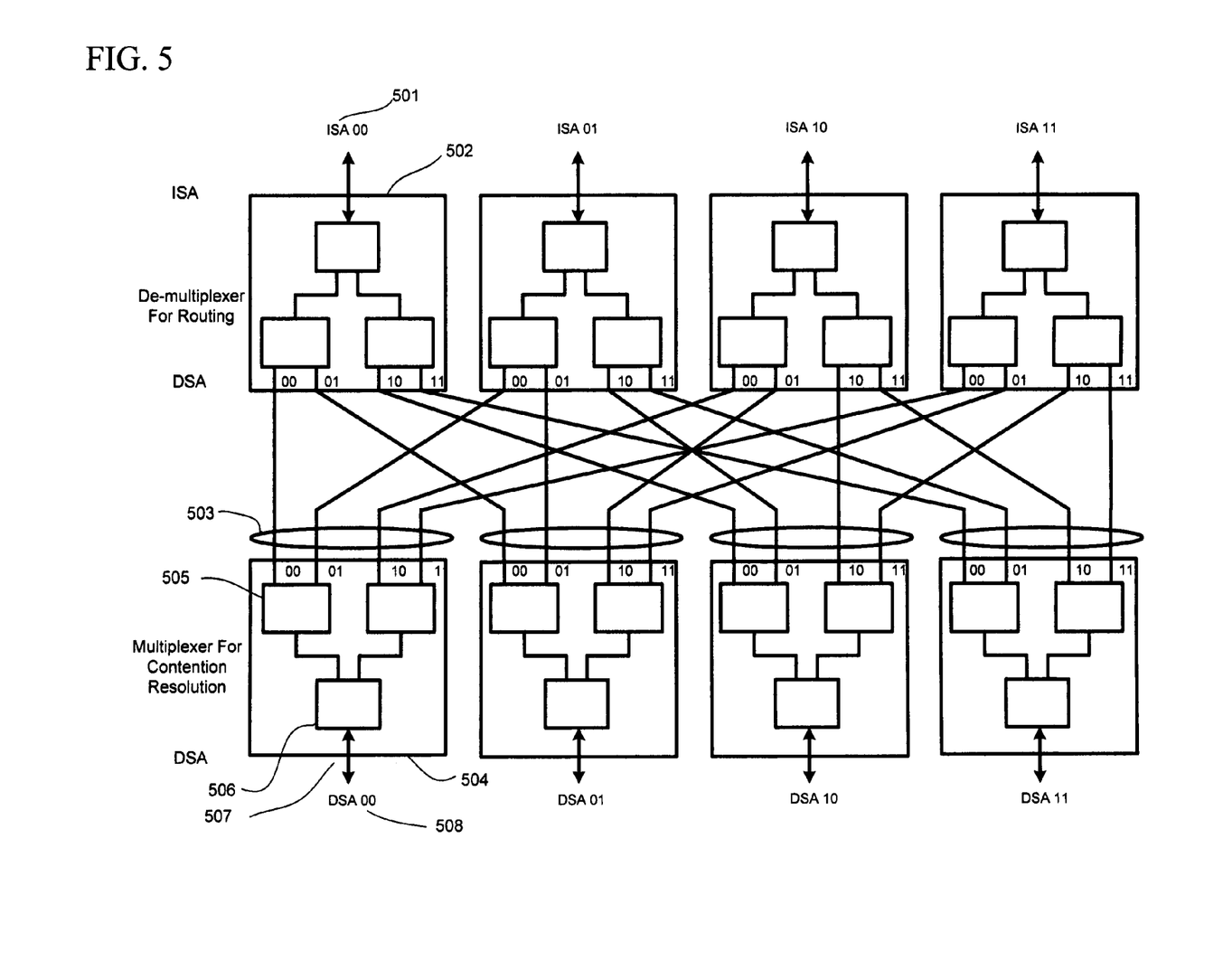
FIG. 5 is a block diagram showing the Control Plane architecture.

The architecture of Control Plane is shown in FIG. 5. The first purpose of the control plane is routing the Request-to-Send (RTS) signal from an ISA [501] to the proper place for contention resolution. An RTS contains the address of the destination Ethernet segment DSA. The RTS is self-routed using its DSA through a de-multiplexer [502]. In one preferred embodiment, the de-multiplexer is structured as a tree for which consecutive bits of DSA are used to set a route position at each level of the tree. The RTS subsequently opens a pathway in the de-multiplexer for contention resolution for the requested destination Ethernet segment.

The second purpose of the control plane is to gather [503] the RTS for the same destination Ethernet segment for contention resolution. After the RTS passes through the de-multiplexer and using up its DSA for routing, RTSs from different inputs for the same DSA are grouped together as input to a multiplexer [504] for that DSA.

The tree is made up of Contention Resolvers (CR) [505] that resolves contention of RTS on a first come first serve (FCFS) basis. Each CR has N inputs (N=2 in the figure) for which an arrival RTS could connect to its single output if that output is not already connected to any input; otherwise the arriving RTS is pre-empted by an earlier arriving RTS, and thereby loses the contention on an FCFS basis. The state of a CR is its state of connection, i.e. if the CR is not connected or if connected, which input the CR is connected to.

The surviving RTS of a CR then proceeds to contend at the next level of the multiplexer [506]. The RTS wins the final contention resolution process of the DSA at the bottom of the multiplexer [507] which connects to the DSA requested [508].

Figure 6:
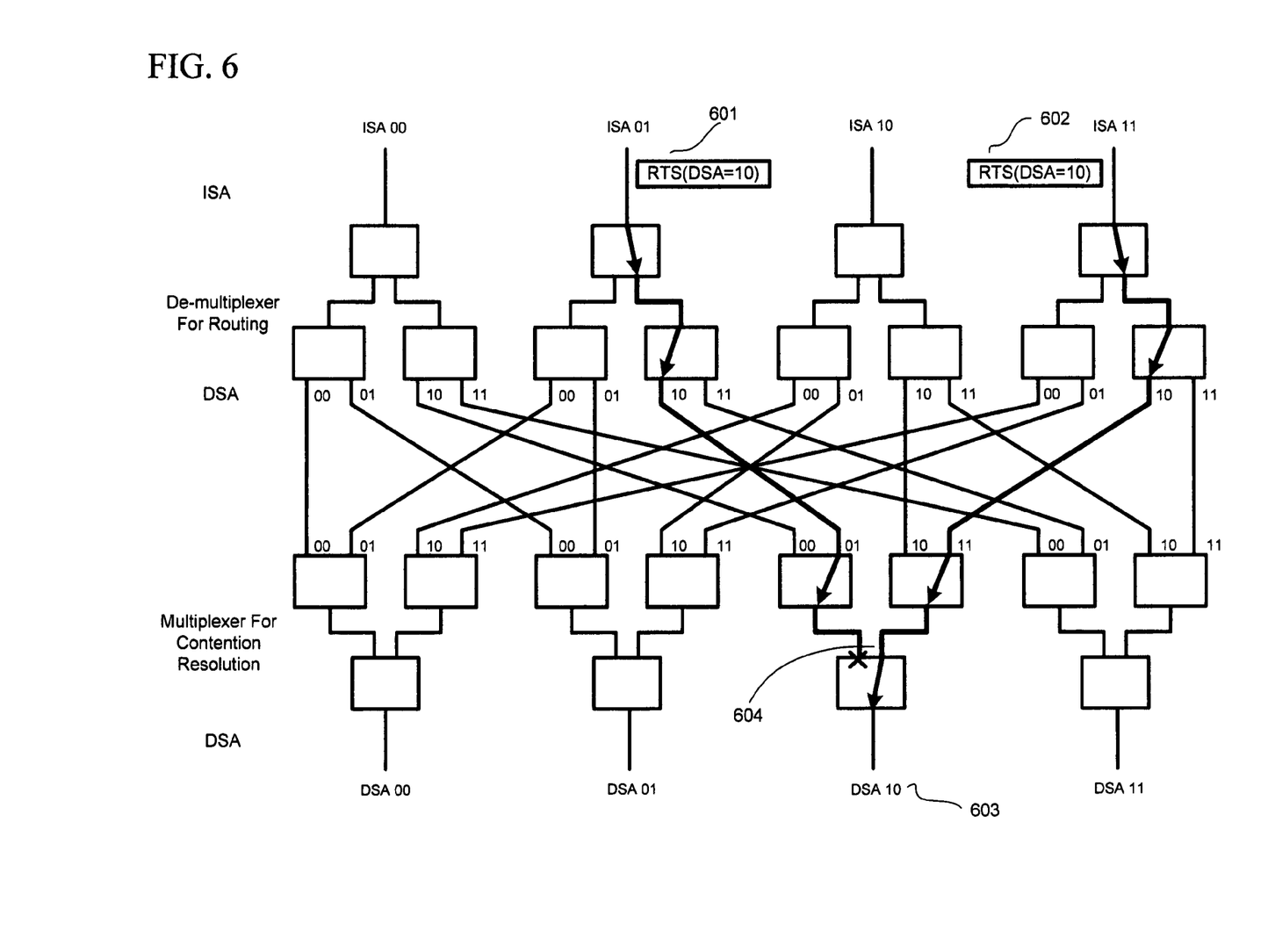
FIG. 6 is a diagram showing the routing example in Control Plane.

Referring to FIG. 6, we illustrate address decoding and contention resolution processes and trees with the example of 2 RTSs from input ISA 01 [601] and ISA 11 [602], both contending for the DSA 10 [603]. The RTS from ISA 11 [602] is made earlier than the RTS from ISA 01 [601], winning the contention resolution as the RTS from ISA 01 [601] loses the contention at the bottom of the multiplexer.

Figure 7:
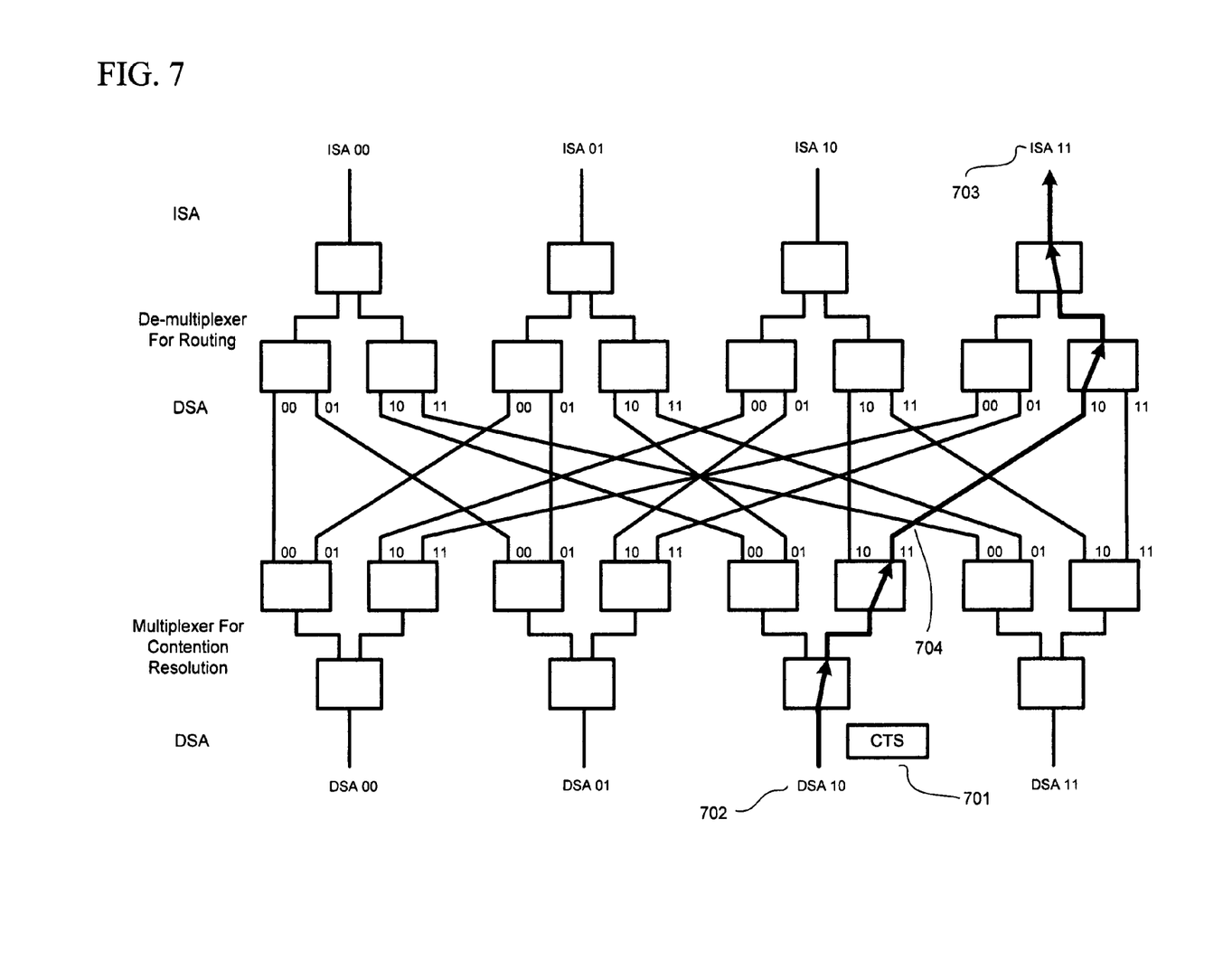
FIG. 7 is a diagram showing the Clear-To-Send signaling in Control Plane.

Referring to FIG. 7, the RTS that survives overall wins the contention resolution process. That RTS from the requesting ISA for access to the DSA is now cleared to send, and a CTS signal [701] can be sent from the DSA [702] back to the ISA [703]. The CTS signal propagates backward using the path [704] opened from the winning ISA that has now connected to the DSA.

An RTS that fails to reach the bottom of the multiplexer loses the contention resolution. The sending ISA fails to receive the CTS signal. In one preferred embodiment, a Not-Clear-To-Send (NCTS) signal propagates backward to clear the opened path. The initiating HBA buffers the data for later attempts to send.

Figure 8:
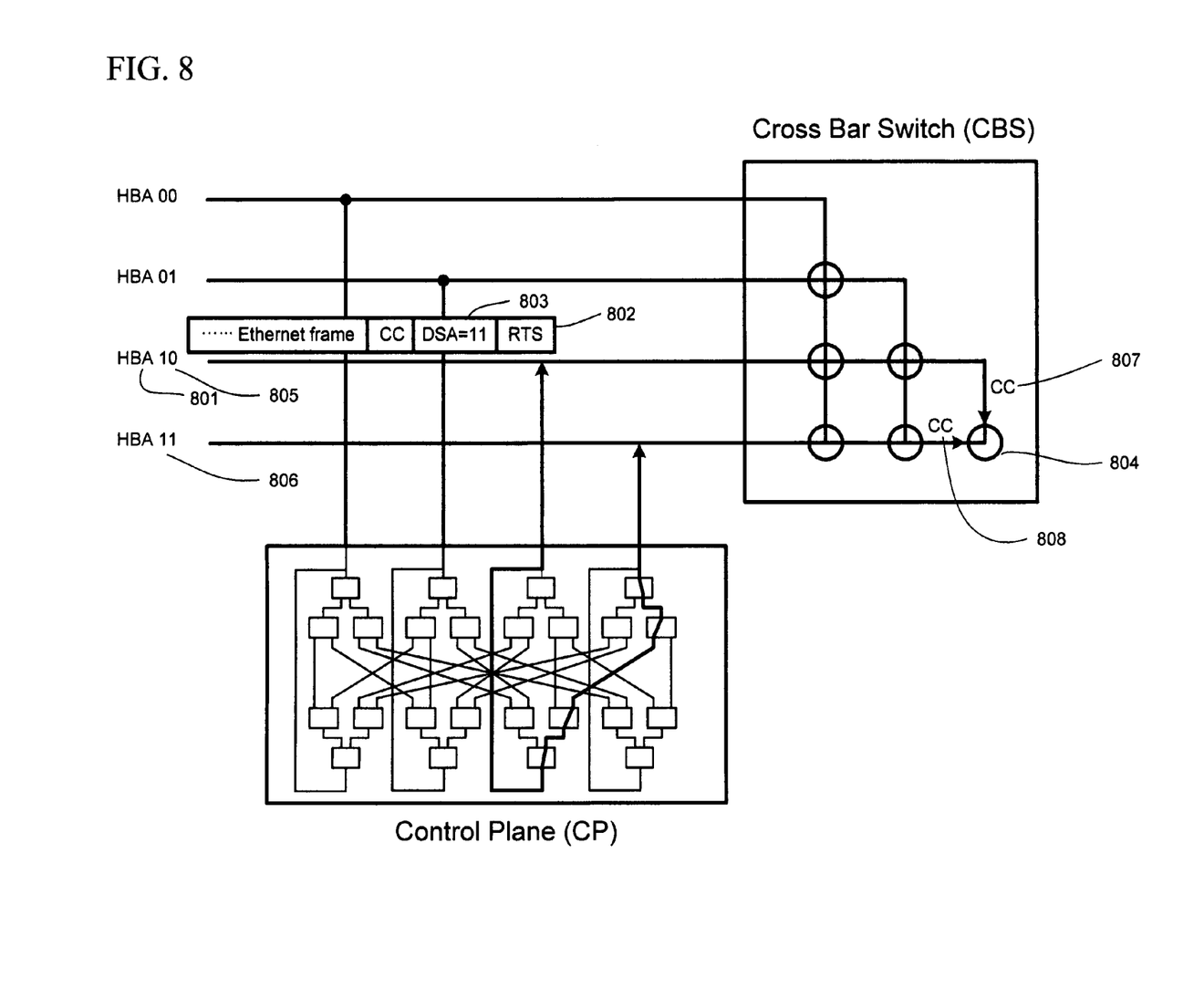
FIG. 8 is a diagram showing the process of completion of connection request by closing cross point in Cross Bar Switch.

Referring to FIG. 8, the third purpose of the control plane is then to connect the input Ethernet HBA [801] with a successful RTS [802] to the requested destination Ethernet [803]. The cross point is referenced by the address pair (ISA [805], DSA [806]). One preferred embodiment allows for the initiating HBA [801] to send a CC command right after the RTS. If the RTS is successful, then 2 CC [807], [808] arrive at the cross point (ISA, DSA) [804] simultaneously, to the ISA since the HBA is directly attached to the ISA and to DSA through the path opened in the control plane.

Another (less preferred) method to close the crosspoint is for the DSA to send a Connect Command (CC) signal to the Initiating Segment (IS) and Destination Segment (DS) simultaneously. The CC signal is sent on the DS from the DSA, and the same CC signal is sent back to the ISA using the path opened in the CP back to the IS. The crosspoint at (ISA, DSA) receives simultaneously the CC signal for the crosspoint to close.

A possible problem arises when we attempt to close two crosspoints, say (ISA, DSA) and (ISA', DSA') simultaneously. The CC commands travels on four Ethernet segments ISA, ISA', DSA, and DSA'. Subsequently the crosspoints (ISA, DSA') and (ISA', DSA) may also be inadvertently closed. While this is unlikely because the two CCs may not be simultaneous, we can avoid this by sending distinguishable connection commands CC and CC'.

Simple logic is implemented at each crosspoint to detect simultaneously arriving CCs that are identical. Upon detection, the crosspoint is closed.

Likewise, simple logic is implemented at each crosspoint to detect simultaneously arriving Disconnect Commands (DC) that are identical. Upon detection, the crosspoint is opened and thereby disconnects.

Once the CTS is received by the IS, data transmission through the PP begins.

The same DC signal going through the CP disconnects the entire path in the CP opened by the successful RTS.

Upon completion of data transmission, a DC is sent from the IS through the PP to open the crosspoint. A DC signal may disconnect every crosspoint associated with the IS.

An alternative disconnect method is to have the HBA send an explicit DC signal through the IS to the crosspoint (ISA, DSA). The DC signal arrives at ISA directly through the PP, while the same signal arrives at DSA through the path opened in the CP before arriving at the DSA.

Upon simultaneous detection of identical DC signal at the crosspoint (ISA, DSA), the crosspoint disconnects.

Two-Stage Network and Control Architecture

To expand the switch, we may use Multi-stage Interconnection Networks (MIN). A Switch Plane (SP) consists of the PP of CBS and CP of demux-mux described earlier. We now use multiple SP in a stage connected to multiple SP in another stage. An SP now has two sides: Side A connects the multiple HBA at the input, and Side B connects to SP in another stage of SPs.

Figure 9:
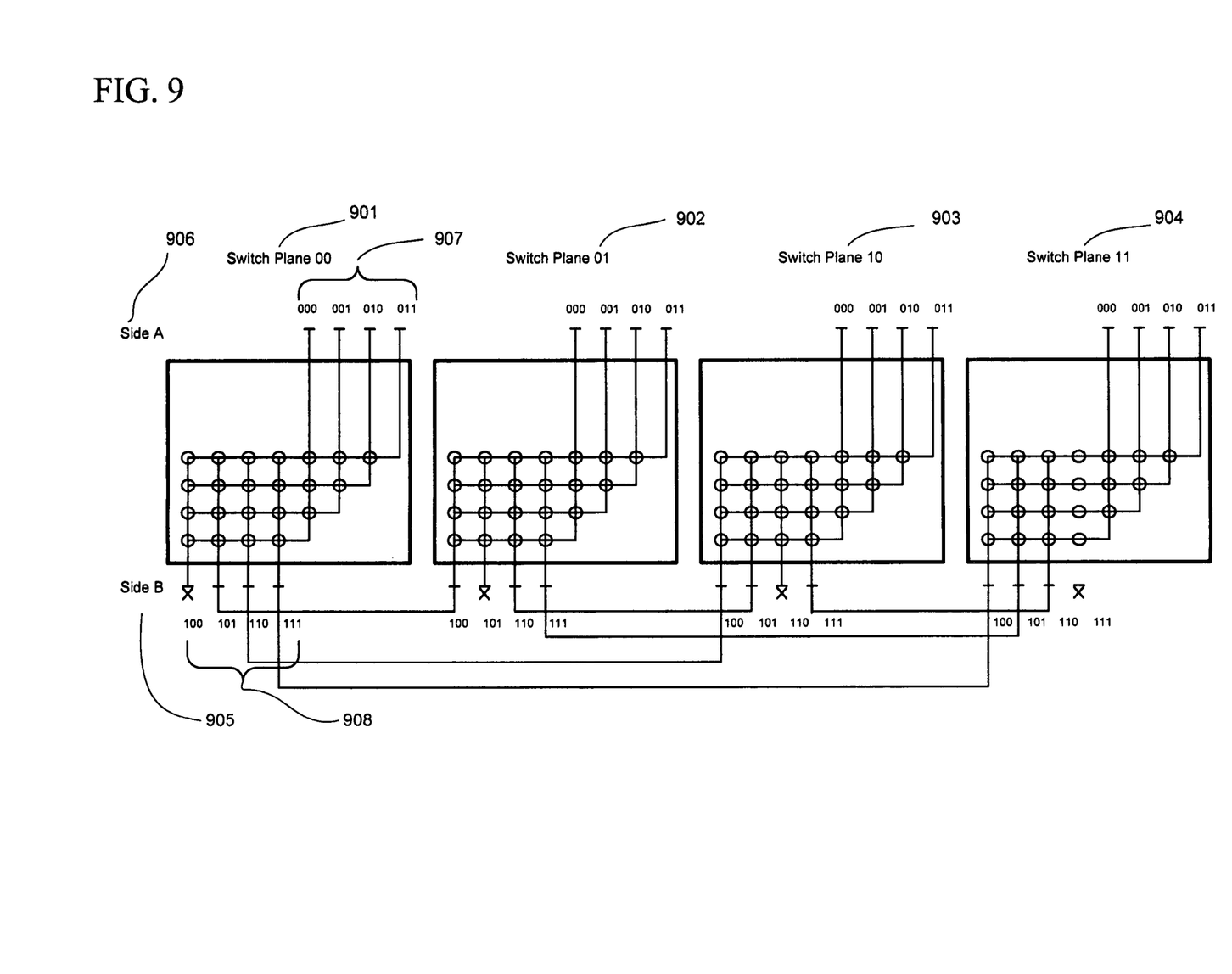
FIG. 9 is a block diagram showing two stage Switch Plane architecture.

We show a two-stage Space Space (SS) switch for 4×4 SPs with 2 sides (A and B) in FIG. 9. Since CP is directly attached to PP in each SP, and it is not shown in FIG. 9. The SPs are numbered as 00, 01, 10, and 11 respectively, [901] [902] [903] [904] as shown. Since paths are full duplex, the two stages are folded as shown. Side B [905] of each SP uses one segment to connect to each of the other SPs. Since we have 4 SPs in our example, there are 3 segments on side B to connect to the other 3 SPs.

In this example, the 4 SPs each have 4 input segments. These 16 segments may connect to each other. The segment addresses on Side A [906] are preceded by 0, i.e. they are 000, 001, 010, and 011 [907]. The segment addresses on Side B are preceded by 1, i.e. they are 100, 101, 110, and 111 [908]. The PP can be realized by an 8×8 CBS that interconnects 8 segments numbered 000 to 111.

Figure 10:
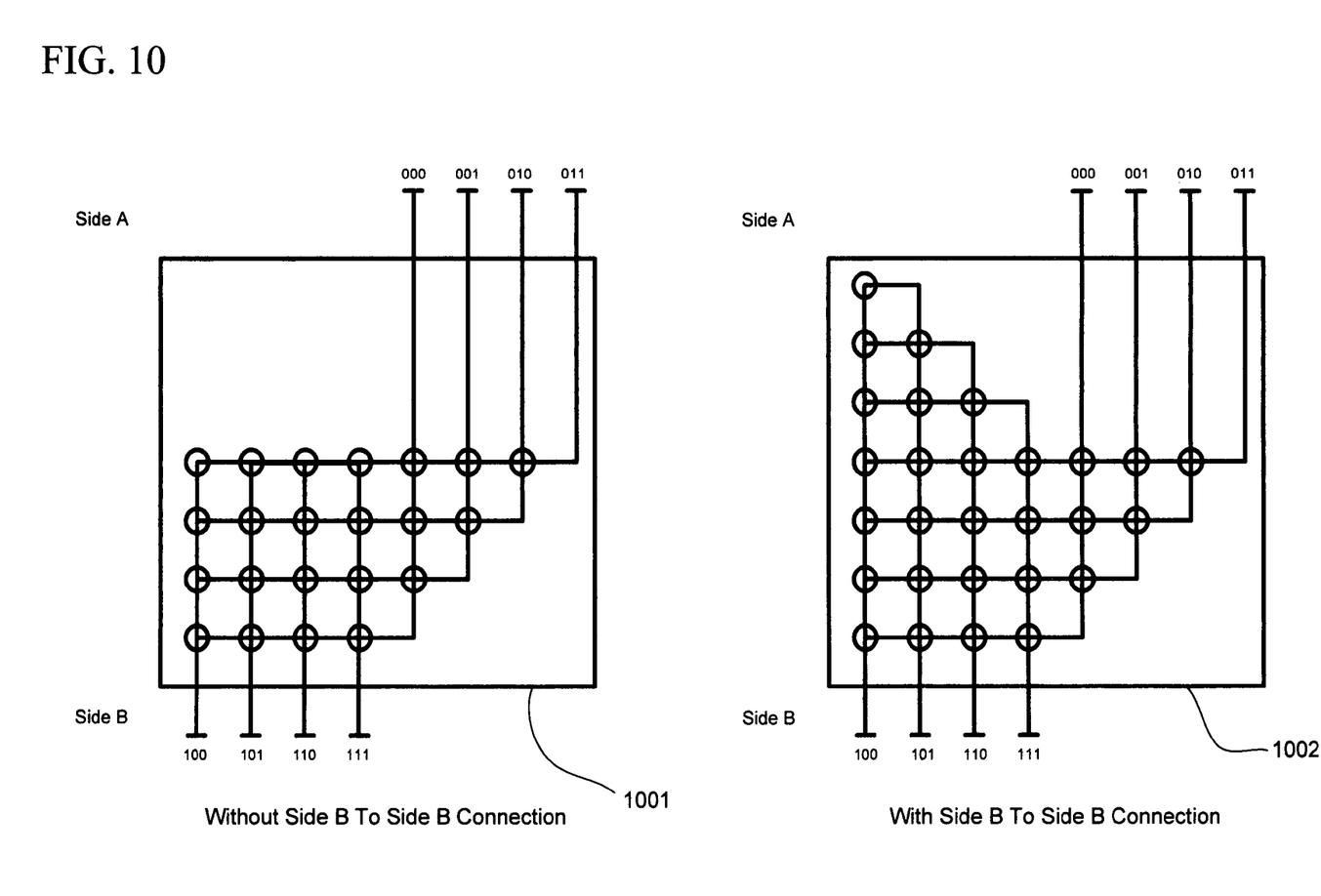
FIG. 10 is a diagram comparing two different two-side Switch Planes.

Referring to FIG. 10, the architecture for the CP of a two sided SP is the same as of an 8×8 CP of a single stage SP. Any Side A segment may be connected to another Side A or Side B segment. Any Side B segment may be connected to another Side A segment [1001]. We may allow a Side B segment to be connected to another Side B segment [1002] in a scenario to provide alternative paths in a 2-stage SS network.

If two segments to be connected are on the same SP, then the two segments are on the side A of the same switch. The method of connection is same as that of a single stage S switch without the need to reach the Side B of the SP for the purpose of reaching another SP.

If the two segments to be connected are on different SPs, then connectivity between the two segments must use the single segment between the two SPs. The routing is now done in 2 stages, first to the Side B segment connecting to the Destination Switch Plane (DSP) and then to the intended DSA on the DSP. Contention resolution is performed in 2 stages, first for the segment on Side B associated with the DSP, and second for the DSA segment. A CTS message is sent back to the ISA on the Initiating Switch Plane (ISP) only if both segments are available.

The CP and PP in each SP of multiple-stage MIN operates similar to that of a single stage, except for one distinction. Since the RTS has to proceed to later stages for further contention resolution, no CTS is immediately returned to the initiating HBA or Ethernet. Neither is there the immediate need to connect the crosspoint in that stage. Instead, the RTS proceeds further using the path opened already in the CP of the current stage to the next stage SP for further address decoding and contention resolution in the next stage CP.

Figure 11:
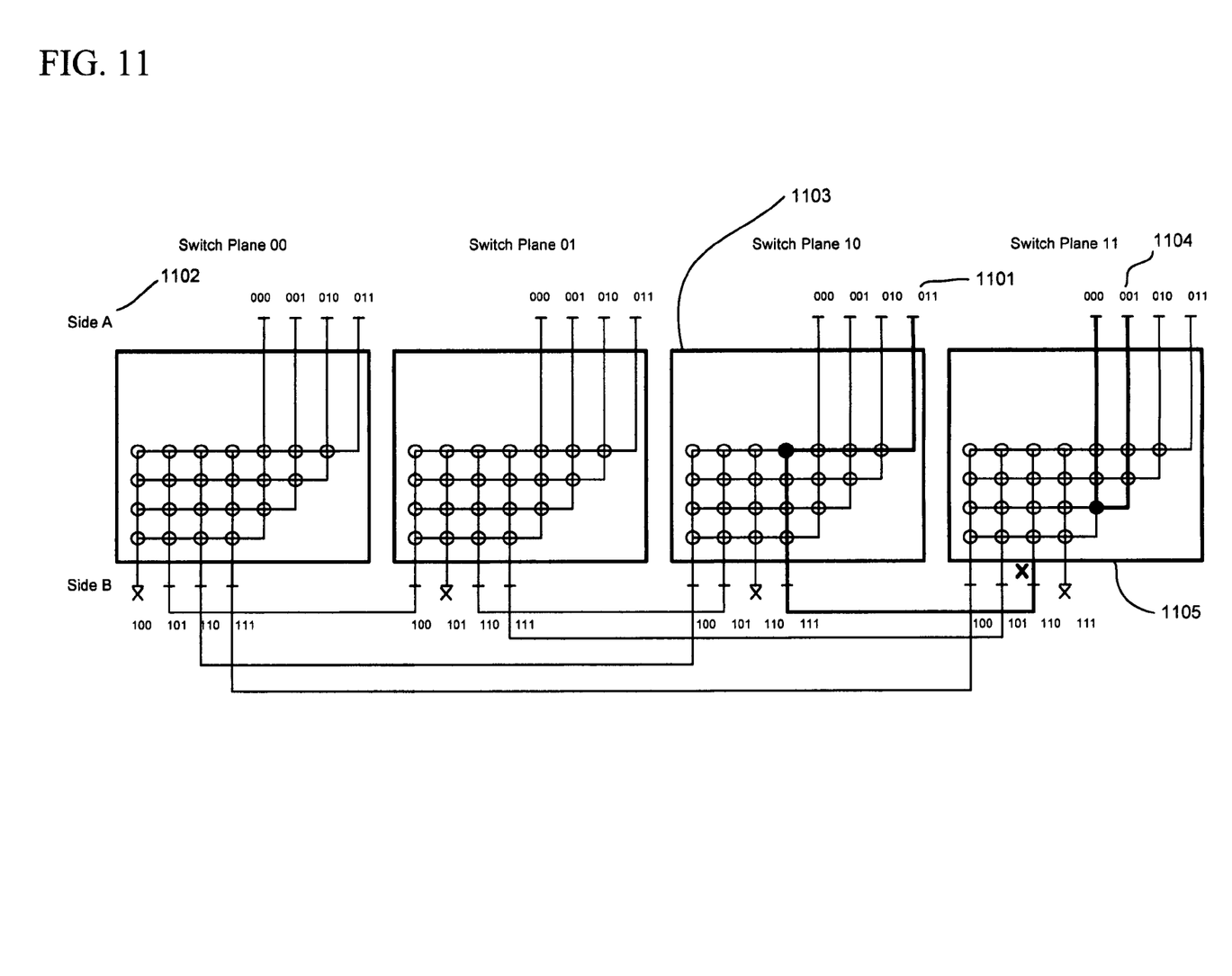
FIG. 11 is a diagram showing the routing example of two stage Switch Plane.

An example is given to illustrate signal flow and process in FIG. 11. Suppose segment 11 [1101] on Side A [1102] of SP 10 [1103] is to connect to segment 01 [1104] on Side A of SP 11 [1105]. The contention resolution for DSP 11 [1105] was successful, but the contention resolution for DSA 01 [1104] on Side A of SP 11 was not successful. The ISA 11 [1101] on the ISP 10 [1103] receives no CTS and therefore may not send data subsequently.

If for the same example, we have instead the contention resolution for DSP 11 was unsuccessful, the two-stage SS MIN provides Alternative Switch Planes (ASP) to complete the connection. In fact any SP other then the DSP 11 or ISP 10 may be chosen as ASP. If routing to an ASP is feasible, then we proceed to connect to the desired DSP from the ASP, i.e. we need to connect two Side B segments of the ASP.

Upon successful contention resolution of an RTS through all stages of a MIN, a CC command is sent to set all involved crosspoints in the end-to-end path.

Figure 12:
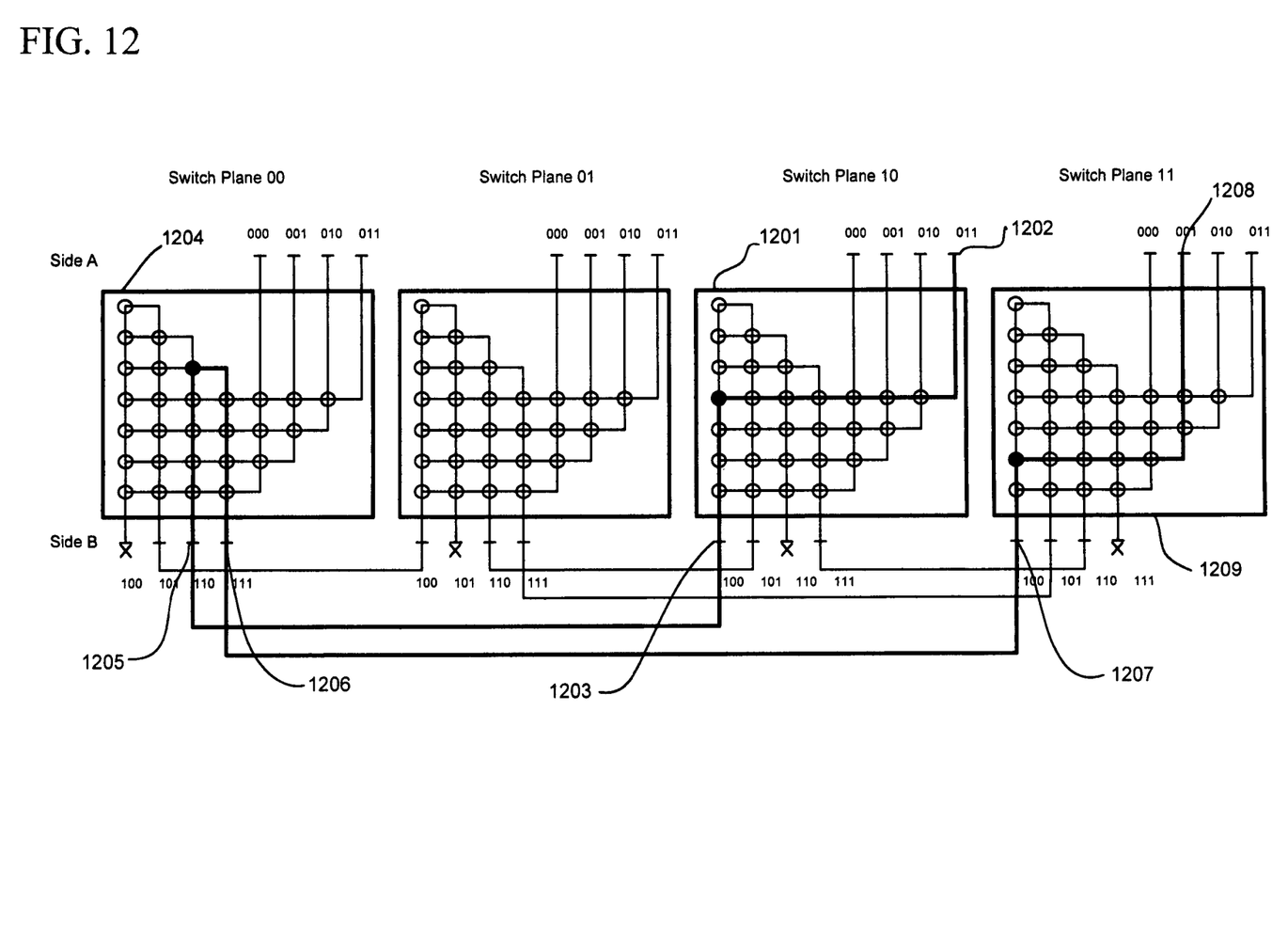
FIG. 12 is a diagram showing the routing example in two stage Switch Plane by using Alternative Switch Plane.

As an example shown in FIG. 12, suppose we choose the ASP 00 [1204]. The routing now is as follows: On SP 10 [1201], we route segment 011 [1204] to segment 100 [1203]; then on SP 00 [1204], we route segment 110 [1204] to segment 111 [1206]; and finally on SP 11 [1209], we route segment 100 [1204] to segment 001 [1208], the DSA. The connection is successful if all segments involved are available.

Since there are multiple ASPs, it is highly likely that at least one ASP complete connectivity to the DSP. However, the DSA on the DSP must be available for the RTS to be granted CTS. If that final destination is busy, no rerouting could help.

While the 2-stage SS switching network allows alternative paths using ASP, the use of ASP should be limited due to the following reason: it uses two Side B segments instead of a single Side B segment compared with the case of ISP connected directly to the DSP. This creates congestion of segment use between the two stages. Congestion in turn forces more connections to use the 2 hop ASP approach, thereby creating further congestion.

Three-Stage Network and Control Architecture

To relieve this congestion, a 3-stage SSS MIN may be employed. Instead of connecting the SPs directly by Ethernet segments, the SPs are connected via Side B by one sided SPs. This is analogous to the 3 stage SSS Clos network for telephone switching. The first and third stages are folded into a single stage due to full duplex operation.

Similar to the 2-stage SS network, two Ethernet segments on Side A of the same SP can be connected as if routed through a single stage S switching network described earlier.

If two Ethernet segments are on different SPs, then connection is completed via a second stage one sided SP. Each second stage SP may provide an alternative path for completing the connection. The first stage SP may allocate an idle Side B Ethernet segment to advance the step-by-step carrier sensing in the CP beyond the first stage SP.

Beyond the first stage, the route to the Destination Segment Address (DSA) is specified by the SP on which the DSA is located and the local segment address (LSA) of the DSA on the SP. In other words, the DSA is addressed as a pair of addresses with DSA=(DSP, LSA)

Figure 13:
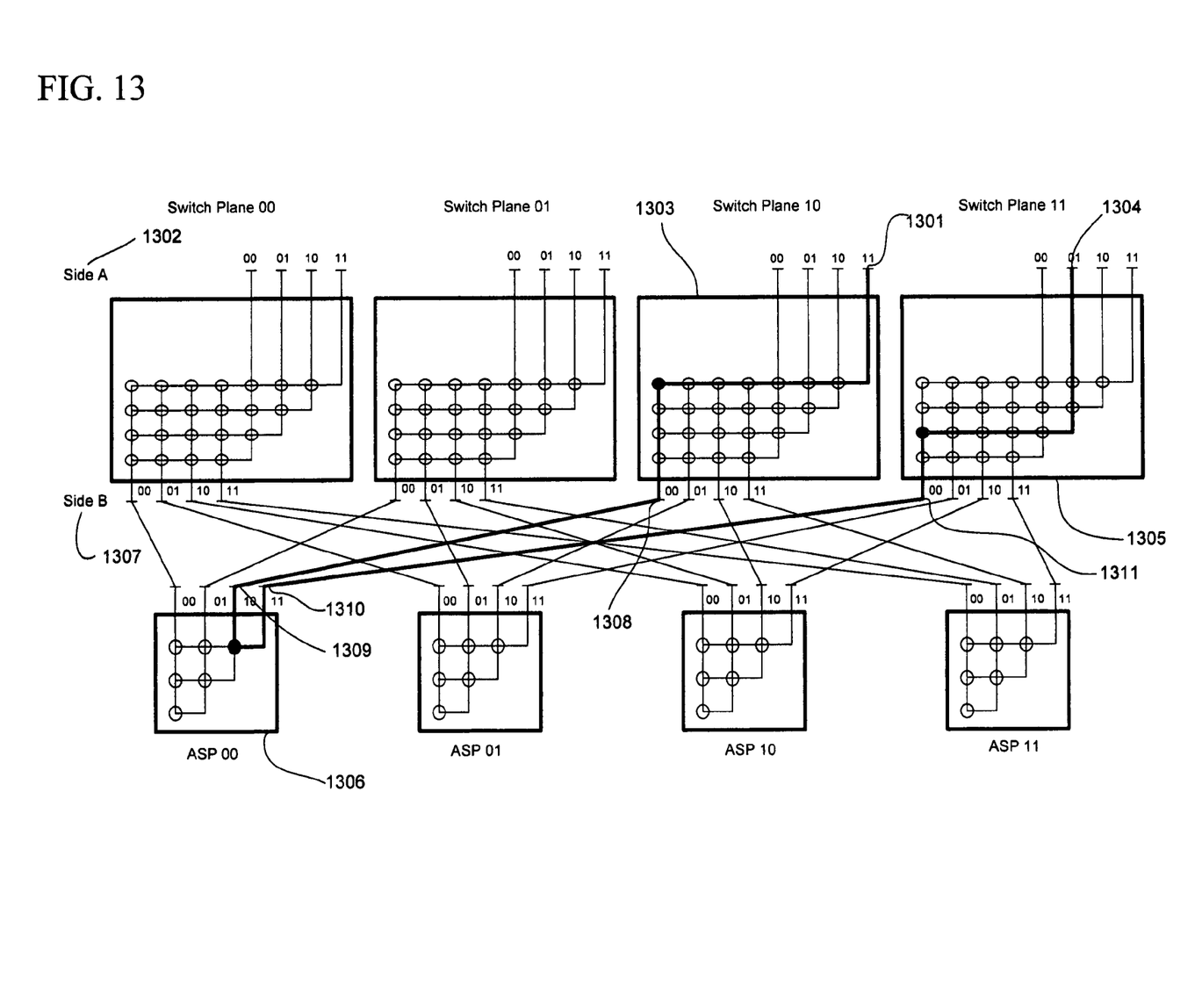
FIG. 13 is a diagram showing the routing example of three stage Switch Plane.

An example is used to illustrate SSS switch route control in FIG. 13. Suppose segment 11 [1301] on Side A [1302] of SP 10 is to connect to segment 01 [1304] on Side A of SP 11 [1305]. Therefore, we require the connection of ISA=(10, 11) to DSA=(11, 01). Suppose the ASP=00 [1306] is used. The connection to be established now proceeds step-by-step as follows. In the first stage switch plane SP=10 [1303], the initiating segment 11 on Side A connects to segment 00 [1308] on Side B [1307]. In the second stage switch plane chosen SP=00 [1306], LSA=10 [1309] is to complete connection to LSA=11 [1310] in order to connect to the DSP=11 [1305]. In the third stage switch plane DSP=11 [1305], LSA=00 [1311] on Side B is to connect to LSA=01 [1304] to complete connection to DSA=(11, 01).

If the connection is completed in the 3-stage network, the ISA=(10,11) is notified CTS via the reverse path opened from ISA to DSA. If the DSA Ethernet is busy, a NCTS signal is sent back to ISA. If the Ethernet segment between stage 2 and stage 3 is busy, another ASP could be attempted access by the first stage switch.

The 3-stage SSS network allows for many alternative paths without the disadvantage of the 2-stage SS network which could double congestion between stages. Also, the number of second stage SP and hence the number of alternative path can be flexibly engineered according to traffic load of the switch.

Multi-Protocol Switching Network

The relative passive Physical Plane (PP) and the lack of regeneration and buffering of data make the PP protocol agnostic. Other than the use of the CSMA methods emblematic of the Ethernet protocol via explicit sending of RTS and CTS signals, the transport and control of data is quite independent of the underlying protocol. Therefore, a key aspect and advantage of the disclosed invention is the control architecture can be used independent of any particular protocol. Nevertheless, the preferred embodiment is Ethernet as the predominant physical layer transport method, as it is ubiquitous, efficient, and cost effective.

The invention allows semi-permanent connectivity of Ethernet segments, rather than a frame-by-frame switching mode. This advantageously facilitates the use of the same switch for Virtual Local Area Networks (VLAN) interconnecting Ethernet LANs.

It is within the scope of the invention to use the disclosed switching network and associated control as a bridge mechanism for industry standard computer interfaces, in particular Peripheral Component Interconnect (PCI and PCI-Express).

It is also within the scope of the invention to use the disclosed switching network and associated control as the switch fabric for Storage Area Networks (SANs). Storage facilities such as Hard Disk Arrays (HDA) and Storage Servers (SS) may be interconnected by the disclosed switching network. HDA and SS may use storage protocols such as FibreChannel (FC). Protocol adaptation at the HBA for FC over Ethernet is within the scope of the invention and this allows use of the invented switch as a SAN.

It is also within the scope of the invention to use the disclosed switching network and associated control as the switch fabric for a storage application of Internet SCSI (iSCSI). The iSCSI protocol leverages the Internet to serve as a long distance capable SCSI connection. Protocol adaptation at the HBA for SCSI over IP or SCSI over Ethernet is within the scope of the invention and this allows use of the invented switch for storage applications.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A switching system for carrier sensed transmission, comprising:
    a switch comprising a plurality of inputs and outputs interconnected by a network of transmission links;
    out-of-band controllers configured such that requests-to-send provided to the inputs of the switch are routed and arbitrated for clearance of sending in consecutive said transmission links of a first path forming a connection between a requesting said input to a requested said output; and
    wherein the out-of-band controllers are configured to complete the connection if spatially and conjunctively the transmission links of the first path are sensed not to have a carrier as represented by the out-of-band controllers, wherein the out-of-band controllers comprise:
    an address decoder for each said switch input constructed as a demultiplexer through which said request-to-send messages are routed according to a destination output address; and
    a contention resolution multiplexer; wherein the contention resolution multiplexer is configured to provide a conflict resolution process wherein the request-to-send messages from different said inputs for a common said output are grouped as inputs to the contention resolution multiplexer through which contending said request-to-send messages are resolved first come first served.

2. The switching system as specified in claim 1 wherein the out-of-band controllers are configured such that upon sensing a carrier in one said link of the first path the out-of-band controllers randomly select a second path for carrier sensing and completion of a connection if spatially and conjunctively the transmission links of the second path are sensed not to have a carrier.

3. The switching system as specified in claim 1, further comprising a network interface configured to:
    transmit a signal maintaining the same format through the switching system;
    send request-to-send messages for specific said outputs to the switch for spatial carrier sensing;
    provide information of the first path to the switching system for step-by-step carrier sensing, with a request specifying the first path to be carrier sensed;
    cache path information for retrieval of path for requested said outputs;
    receive clear-to-send messages from the switching system; and
    transmit data upon receiving the clear-to-send message.

4. The switching system as specified in claim 1, further comprising a network interface configured to:
    transmit a signal maintaining the same format through the switching system;
    send request-to-send messages for specific said outputs to the switch for spatial carrier sensing;
    provide information of the first path to the switching system for step-by-step carrier sensing, with a request specifying the first path to be carrier sensed;
    cache path information for quick retrieval of path for requested said outputs;
    receive clear-to-send messages from the switching system; and
    transmit data upon receiving the clear-to-send message.

5. The switching system as specified in claim 1 wherein the out-of-band controllers are configured to control a closure of a crosspoint at an intersection of the input with a winning said request-to-send and the output requested when a connection command arrives simultaneously at the input and the output.

6. The switching system as specified in claim 1 wherein the out-of-band controllers are configured to send a clear-to-send message to a network interface indicative that the network interface has won a contention resolution and is allowed to transmit data.

7. The switching system as specified in claim 1 wherein the switching system is configured to make connections between Ethernets on a frame-by-frame basis or on a semi-permanent basis using the same physical level Ethernet frame transmission format in the Ethernet interfaces and the links in the switching network.

8. The switching system as specified in claim 1 wherein the switching system is configured to make connections between Peripheral Component Interconnect PCI-express interfaces on a frame-by-frame basis or on a semi-permanent basis using the same physical level Ethernet frame transmission format in the Ethernet interfaces and the links in the switching network.

9. The switching system as specified in claim 1 wherein the switching system is configured to make connections between Small Computer System Interface SCSI interfaces on a frame-by-frame basis or on a semi-permanent basis using the same physical level Ethernet frame transmission format in the Ethernet interfaces and the links in the switching network.

10. The switching system as specified in claim 1 wherein the switching system is configured to make connections between FibreChannel interfaces on a frame-by-frame basis or on a semi-permanent basis using the same physical level Ethernet frame transmission format in the Ethernet interfaces and the links in the switching network.

11. A multi-stage switching system comprising a plurality of interconnected switch planes, wherein each said switch plane comprises:
    a switch comprising a plurality of inputs and outputs interconnected by a network of transmission links;
    out-of-band controllers configured such that requests-to-send provided to the inputs of the switch are routed and arbitrated for clearance of sending in consecutive said transmission links of a first path forming a connection between a requesting said input to a requested said output; and
    wherein the out-of-band controllers are configured to complete the connection if spatially and conjunctively the transmission links of the first path are sensed not to have a carrier as represented by the out-of-band controllers, wherein the out-of-band controllers comprise:
an address decoder for each said switch input constructed as a demultiplexer through which said request-to-send messages are routed according to a destination output address; and
a contention resolution multiplexer; wherein the contention resolution multiplexer is configured to provide a conflict resolution process wherein the request-to-send messages from different said inputs for a common said output are grouped as inputs to the contention resolution multiplexer through which contending said request-to-send messages are resolved first come first served.

12. A switching system for carrier sensed transmission, comprising:
a switch comprising a plurality of inputs and outputs interconnected by a network of transmission links;
out-of-band controllers configured such that requests-to-send provided to the inputs of the switch are routed and arbitrated for clearance of sending in consecutive said transmission links of a first path forming a connection between a requesting said input to a requested said output; and
wherein the out-of-band controllers are configured to complete the connection if spatially and conjunctively the transmission links of the first path are sensed not to have a carrier as represented by the out-of-band controllers, wherein the out-of-band controllers comprise:
an address decoder for each said switch input constructed as a demultiplexer through which said request-to-send messages are routed according to a destination output address; and
a contention resolution multiplexer; wherein the contention resolution multiplexer is configured to provide a conflict resolution process wherein the request-to-send messages from different said inputs for a common said output are grouped as inputs to the contention resolution multiplexer through which contending said request-to-send messages are resolved first come first served,
wherein the out-of-band controllers comprise a multi-stage out-of-band controller configured such that one said request-to-send message completes the contention resolution process through all stages of the out-of-band controller associated with the first path before sending a clear-to-send message to a requesting said input.

13. The switching system as specified in claim 11 comprising two said switch planes, wherein a first said switch plane comprises one said output coupled to a one said input of a second said switch plane.

14. The switching system as specified in claim 11 comprising two said switch planes, wherein a first said switch plane comprises one said output coupled to one said input of a second said switch plane through an intermediate switch plane.

15. The switching system as specified in claim 11 comprising three said switch planes, configured such that an input of a third said switch plane is connected to an output of a first said switch plane through a second said switch plane.

16. The switching system as specified in claim 11 wherein the out-of-band controllers are configured such that upon sensing a carrier in a link of a first path, the respective out-of-band controller then randomly selects a second path for carrier sensing by selecting an alternative switch plane to provide an intermediate link to complete the requested connection.

* * * * *